United States Patent
Chow et al.

(10) Patent No.: US 9,431,827 B2
(45) Date of Patent: Aug. 30, 2016

(54) LOAD ISOLATION CONSUMPTION MANAGEMENT SYSTEMS AND METHODS

(75) Inventors: Bryan Chow, Brooklyn, NY (US); Joshua Weiner, Sausalito, CA (US)

(73) Assignee: Green Charge Networks LLC, Santa Clara, CA (US)

( * ) Notice: Subject to any disclaimer, the term of this patent is extended or adjusted under 35 U.S.C. 154(b) by 857 days.

(21) Appl. No.: 13/460,538

(22) Filed: Apr. 30, 2012

(65) Prior Publication Data
US 2013/0285446 A1    Oct. 31, 2013

(51) Int. Cl.
*H02J 3/32* (2006.01)
*H02J 3/00* (2006.01)

(52) U.S. Cl.
CPC ............ *H02J 3/32* (2013.01); *H02J 2003/003* (2013.01); *Y04S 10/54* (2013.01); *Y10T 307/305* (2015.04)

(58) Field of Classification Search
CPC ......................................................... H02J 3/32
USPC ............... 320/160–162; 307/44–48; 700/295
See application file for complete search history.

(56) References Cited

U.S. PATENT DOCUMENTS

| | | | |
|---|---|---|---|
| 5,500,561 | A | 3/1996 | Wilhelm |
| 5,880,536 | A | 3/1999 | Mardirossian |
| 6,987,332 | B2 | 1/2006 | Mount |
| 7,224,131 | B2 | 5/2007 | Wilhelm |
| 2004/0084965 | A1 | 5/2004 | Welches |
| 2006/0022524 | A1 | 2/2006 | Bryde |
| 2007/0005195 | A1* | 1/2007 | Pasquale et al. ............ 700/295 |
| 2007/0276547 | A1 | 11/2007 | Miller |
| 2009/0189451 | A1* | 7/2009 | Roepke ........................... 307/66 |
| 2011/0055037 | A1 | 3/2011 | Hayashigawa |
| 2011/0118894 | A1 | 5/2011 | Reineccius |
| 2011/0163601 | A1* | 7/2011 | Li et al. .......................... 307/48 |

FOREIGN PATENT DOCUMENTS

| | | | |
|---|---|---|---|
| JP | 2003299247 A | * | 10/2003 |
| WO | WO 2010/053872 A1 | * | 5/2010 |
| WO | WO 2012/062921 A2 | * | 5/2012 |

OTHER PUBLICATIONS

IEEE 100 The Authoritative Dictionary of IEEE Standards Terms, 2000, Standards Information Network IEEE Press, Seventh Edition, p. 939.*

* cited by examiner

*Primary Examiner* — Joseph Chang
(74) *Attorney, Agent, or Firm* — Richard C. Galati; Holland & Hart LLP

(57) ABSTRACT

Disclosed herein are power management systems for controlling recorded electrical demand by isolating loads from a utility distribution grid connection. The loads are isolated when an energy storage system (ESS) is placed in series between the loads and the grid, with a charger that keeps the ESS from depleting and a power converter that provides energy to the loads from the ESS. A system controller may be enabled to manage the charging of the ESS by the charger relative to a consumption metric. In some embodiments, the loads are categorized, controlled, or curtailed by the controller and may be isolated from other loads. Some embodiments include bypass features or bimodal connections. Additional methods of control to prevent depletion of the ESS are also set forth. Systems herein can prevent or limit demand charges, protect the utility grid from backflow and other dangers, and raise the customer's effective utility service limit.

22 Claims, 11 Drawing Sheets

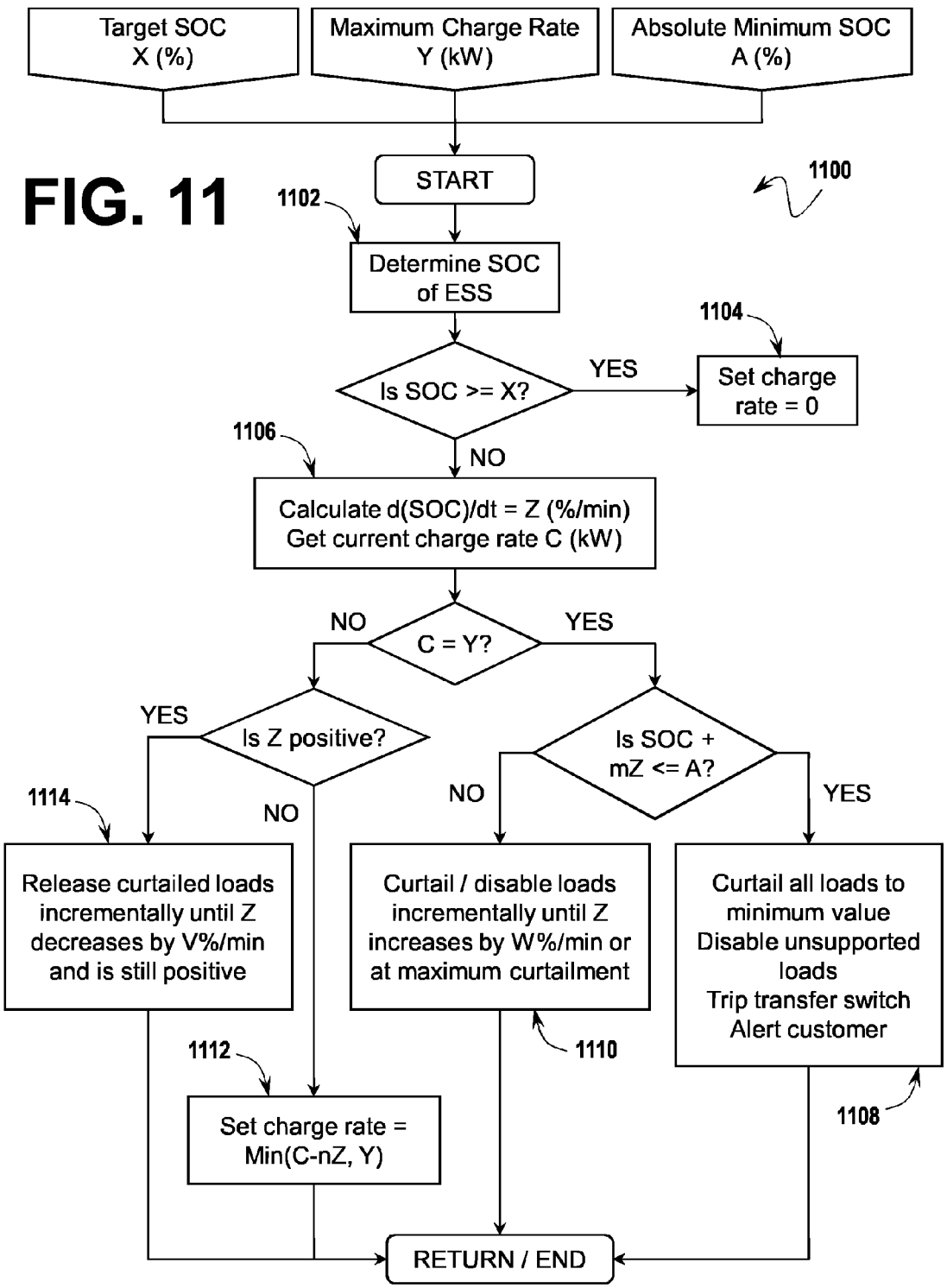

LOAD ISOLATION CONSUMPTION MANAGEMENT SYSTEMS AND METHODS

BACKGROUND

The present invention is directed to the fields of energy consumption management systems, electrical demand charge control, and related fields.

Electricity consumers in recent years have been faced with rising energy costs and rising needs to address environmental and efficiency concerns in the grid. Energy consumption management systems have been developed with these needs in mind to reduce energy consumption during periods having higher electricity costs, to expand the availability of charging electrically-powered vehicles, to participate in demand response programs hosted by utilities, and to counteract the appearance of demand charges assessed by utilities, among other goals. To prevent or diminish the appearance of demand charges, typical consumption management systems employ curtailment techniques such as load shedding, prioritization, and cycling to reduce demand during peak periods when demand charges would otherwise be registered by utility meters. Some management systems include energy storage devices such as battery banks that are discharged at these peak times in such a manner that the net load on the grid is mitigated even if the usage of the loads at the site goes unchanged.

When using energy storage devices or generators to supply energy to a site for consumption management, a system controller monitors the overall consumption of the site and discharges the energy storage or starts up a generator when the consumption is too high. This gives rise to a number of problems. One is the delay between detecting excess consumption and providing energy to the site for sites where an inverter is controlled in response to a command signal. The controller must register that the consumption has surpassed a limiting value, then the controller must send instructions to the energy storage or generator, and then the energy storage or generator must provide the energy required. It is common for a spike in demand to have already subsided before the energy provision takes place, and even if the peak has not subsided, the utility meter has already recorded at least a portion of the peak that exceeds the limiting value. These issues may not be present when an inverter is used that converts power on demand, but the load may still fluctuate dramatically enough that circuit breakers or protective relays are tripped, and the load profile of a mitigated load is usually still erratic.

The reactive design of these systems leaves uncertainty regarding how much consumption will actually be recorded by the utility. Higher sampling rates tend to reduce the uncertainty and allow the system to more closely follow an idea "flat-line" of consumption, but even at high sampling rates there is a chance that protection relays may be triggered before action can be taken. Furthermore, sudden loss or gain of load creates a risk of back-feeding energy to the grid or tripping protective breakers that do not automatically reset. Back-feeding is dangerous to local utility providers as it adds to the risk of tripping network protectors. Additionally, the sampling rate and extreme twitch capability of these systems drives up their complexity and cost, and can damage or at least excessively cause wear to energy storage devices, generators, switches, and other components.

BRIEF SUMMARY

Embodiments of the invention address issues present in the industry by providing systems and methods for isolating loads from the utility distribution grid using an energy storage system (ESS). In some embodiments, a system topology is provided that places the ESS of a consumption management system inline between a utility energy source such as a distribution grid connection and a load of the site. The ESS is charged by a charger such as a rectifier, and the ESS is discharged through an inverter to the loads. In these embodiments, the load is "isolated" from the grid because its consumption, including its demand spikes or other fluctuations, is supplied by the reservoir of energy stored by the ESS while the ESS is recharged at a relatively steady rate using grid energy. Thus, to the utility meter, the load behind the ESS appears to be consuming energy at the rate that the ESS is charged whether or not its demand is erratically shifting. In some embodiments a system controller is provided and enabled to control the charging of the ESS relative to consumption metrics such as the present consumption of the load, the time that the ESS is recharged, the cost of electricity, the overall consumption of the site, etc. The ESS may act as a buffer between the grid and the load so that the system can react to demand fluctuations more slowly or gradually and helps to smooth out the metered load profile, providing greater predictability in demand charges and triggering fewer protective relays or breakers.

In some embodiments, the consumption management system classifies loads differently, and certain loads are controlled or curtailed by a system controller in order to reduce energy consumption from the ESS. In some embodiments, bypass switches or automatic transfer relays are provided that allow isolated loads to receive energy from the utility grid while the ESS is unable to provide energy in a manner that meets the needs of the loads. In some embodiments the ESS is bi-modally connected, allowing on-grid and off-grid operation of loads. In yet other embodiments generators are provided that supplement energy provided from the utility grid. In additional embodiments a main breaker and panel board are provided as part of the system.

Some embodiments of the invention provide methods employed by a system controller in controlling the charging of the ESS to avoid depletion or damage to other equipment.

Additional and alternative features, advantages, and embodiments of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments.

FIG. 11 is a block flowchart illustrating an additional exemplary control algorithm for a system controller of the present invention.

DETAILED DESCRIPTION

General Information

Figure 1:
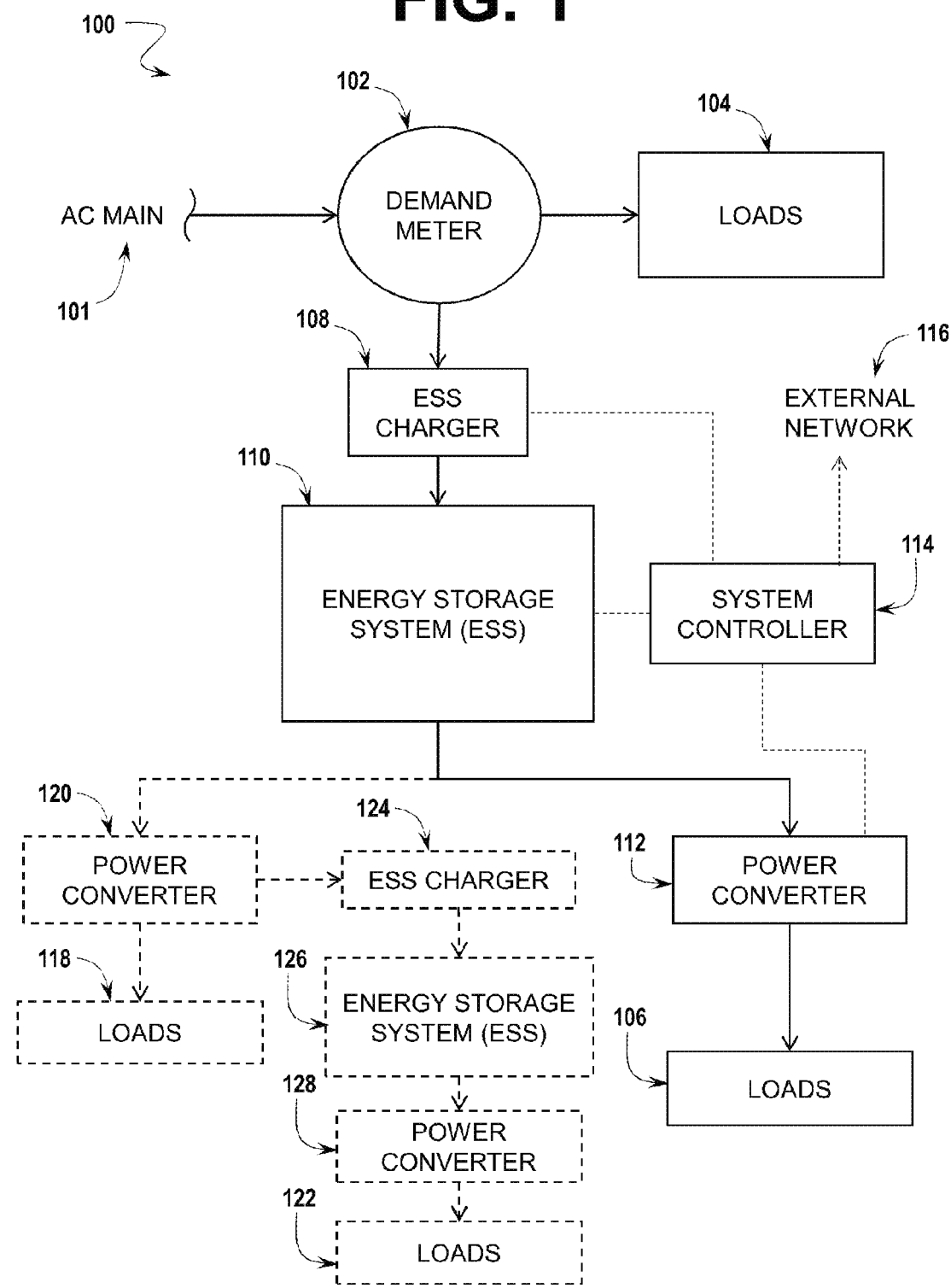
FIG. 1 is a block diagram of an exemplary embodiment of the invention having isolated loads at a utility customer site.

As used herein, an "electrical system" refers to an electrical circuit, device, or network of devices which consume or manipulates electrical energy. Typical exemplary utility customer sites such as a place of business have multiple electrical systems connected to an electrical service panel, and the electrical systems draw electrical energy from a connection to an electrical utility distribution grid.

A "consumption management system" (or "CMS") as used herein, refers to a system of electrical devices and processes capable of affecting the consumption of an electrical system, group of electrical systems, or of a utility customer site as a whole. For example, a CMS may comprise a system controller such as a computer that, when connected to an electrical system, controls when loads of the electrical system are turned on or off. In some embodiments, a CMS may be used to execute instructions for turning electrical systems on and off or to turn consumption of an electrical system up or down (also referred to as curtailment or load shedding), and other consumption control schemes known in the art. Advantageous embodiments of a CMS affect consumption through load mitigation, wherein an energy source such as an energy storage system (ESS) provides energy to a site or to electrical systems. An ESS is comprised of one or more energy storage devices, including, without limitation, a battery, capacitor, supercapacitor, flywheel, or other similar energy-storing device. Some consumption management systems also include a generation asset, such as a fuel-based generator and engine, photovoltaic generator, wind-based generator, fuel cell, or other similar electricity-generating device. Providing energy to a load or electrical system in order to reduce the consumption level of that load or system may be referred to as mitigation or load shifting.

A CMS is beneficial to users because it can provide many different kinds of consumption management. The consumption management provided may include (a) load leveling, wherein the consumption of a site or electrical system is made more level over time (as opposed to rising during peak consumption periods and dropping during low-consumption periods), or (b) peak mitigation, wherein spikes or plateaus of elevated consumption are mitigated or otherwise reduced in order to avoid incurring electrical utility-assessed demand charges or overloading electrical system capabilities.

Typical embodiments of the invention are directed to systems of a CMS, along with related methods, for managing electricity consumption in a manner that largely isolates fluctuations in electrical demand of an electrical system or load from a utility meter. Preferred embodiments of the invention may provide the ability to:

(a) reduce demand charges, (b) provide increased predictability and reliability in demand charges by more effectively allowing load profiles to be "flat-lined,"

(c) protect utility provider and utility customer systems from the effects of large swings in electricity consumption, (d) raise the effective utility customer's consumption limit, (e) increase permissible response time for CMS controls, (f) provide emergency power during utility power outages, (g) provide ability to sell power back to the utility provider, (h) improve the power factor of the utility customer as seen by the utility provider, and (i) more, as will be apparent to a person having skill in the art upon making or using embodiments described herein.

Load Isolation and Management

FIG. 1 shows a block diagram of an exemplary embodiment of the invention wherein a utility customer site 100 is fitted with electrical devices enabled to isolate fluctuations in load demand from the utility provider. The site 100 is provided power from the utility provider through a utility distribution grid connection 101 such as an AC main line. The utility demand meter 102 registers consumption of all loads at the site and is used to collect consumption data such as overall energy used (e.g., in kilowatt-hours) and maximum demand (e.g., in kilowatts) in a billing period. A typical customer location merely connects loads 104 to the demand meter 102 through circuit breakers and panelboards, and immediate electrical demands from the loads are fulfilled by drawing energy from the utility distribution grid connection 101.

According to embodiments of the invention, however, additional loads 106 are connected to the utility distribution grid connection 101 through an energy storage system (ESS) charger 108 that converts power from the grid connection 101 to a form that charges an ESS 110 such as a bank of batteries, flywheels, capacitors, or other electrical energy-storing means known in the art. The ESS charger 108 may be embodied as a rectifier to supply DC power to a battery-based ESS, an AC motor to charge a flywheel-based ESS, or other comparable means to convert the power provided from the utility grid connection 101 to a form of energy stored in the ESS 110. The ESS 110 provides energy to a power converter 112 which converts the energy into a form used to power the isolated loads 106. The power converter 112 may include a DC-to-AC inverter, buck, boost, or buck-boost DC-DC converter, or other conversion device known in the art that can transfer the energy from the ESS 110 in a form useable by the loads 106. In a preferable embodiment, the power converter 112 is a 208 VLL DC-to-AC inverter that is capable of providing utility grid-grade AC power to the loads to which it is connected. An output of the power converter may be controllable by a system controller 114 or it may be able to provide output to the loads 106 on demand and independent of a controller.

A system controller 114 monitors and manages the state of charge of the ESS 110, the charging rate of the charger 108, and potentially other factors, such as the conversion rate of the power converter 112. Preferably, the system controller 114 is capable of determining the rate of charging performed by the charger 108, the state of charge of the ESS 110, and the consumption of the loads through the power converter 112 in order to ensure that the energy stored in the ESS 110 is stabilized. The system controller 114 may also connect to an external network 116 for purposes such as sending and/or receiving information and/or instructions and directions with other devices or computers connected to the network. Such a network may be, for example, a wide-area network (WAN) such as the Internet, or a local area network (LAN) linking the system controller to a localized network of devices.

The controller 114 may be enabled to manage the charging of the ESS by the charger where the charging level is determined relative to consumption metrics. Such consumption metrics may include, for example, (a) the present, historical, or projected consumption of the loads 106, (b) the times of day, week, month, or year at which the charger is used, (c) the cost of charging the ESS, (d) the cost to the utility provider or site operator of not charging the ESS, and/or (e) the overall consumption level of the site.

The present consumption of the loads 106 can affect charging because the charger 108 needs to provide energy to the ESS 110 at approximately the average rate of consumption of the loads over time when keeping the ESS 110 at a stable state of charge. The controller 114 may also factor in the historical consumption or a projected or predicted consumption of the loads 106 to determine whether the ESS 110 should be "pre-charged" to have more charge before a predicted or historical period of higher average load demand. Furthermore, the present consumption of electricity from the grid of the entire site may be an advantageous metric to use in controlling the charging rate because loads other than the isolated loads may cause the demand to rise to a threshold limit such as a demand charge-inducing limit or a utility service limit. With the controller enabled to manage charging according to the overall consumption, however, the charging level can be changed to limit driving the consumption of the site from the grid as a whole to exceed these limits.

The time at which the charger is used may affect the charging level output of the charger 108 because time may correlate with the price of electricity, and therefore the cost of charging the ESS, the expected consumption of the site in the future (suggesting a need for precharging), whether a technician is on-site or available to monitor the CMS, the temperature of the CMS (and therefore the efficiency), and/or other factors which may be taken into consideration when implementing and using the CMS.

The cost of charging the ESS can affect the charger 108 management because in a CMS designed to reduce demand charges, the cost of electricity (i.e. price per kilowatt-hour), the cost of additional demand (i.e. price per kilowatt, such as a demand charge), and the cost of wear on the CMS due to operating the charger (e.g., the cost of the reduced expected lifetime of batteries in the ESS). These can be driving factors in whether the charger 108 should be used and the rate at which it should be used.

There may also be costs associated with not charging the ESS. For example, in some cases, the utility provider requests that consumption is increased to artificially increase demand to compensate for over-supply conditions on the distribution grid. Here, the CMS operator may use the charger to participate in this program by increasing the charge rate of the ESS 110, even if the ESS 110 would not be charged at an elevated rate for another reason, because the operator would benefit from increasing demand for the utility provider.

The isolated loads 106 in this embodiment can be said to be "isolated" from the grid connection 101 because their energy demands are supplied from the ESS 110 rather than directly from the grid connection 101 through the demand meter 102, as is seen with the other loads 104. The charging of the ESS 110 is not controlled by the loads 106, though the rate of ESS charging may be affected by the consumption of the loads 106. The energy used over time (i.e. kilowatt-hours) by the isolated loads 106 in such a system will generally match the energy used over time of the same loads if they were not isolated, due to the ESS 110 being recharged at roughly the average level of consumption of the loads 106 over time, but instantaneous demand of the isolated loads 106 is not detected by the demand meter 102. Furthermore, when the utility distribution grid connection 101 experiences a brownout or blackout, the isolated loads 106 are still able to temporarily receive energy that is stored in the ESS 110. The energy buffering resulting from the position of the ESS 110 between the grid 101 and the loads 106 masks fluctuations in demand of the loads 106 because they are absorbed by the ESS 110. The demand meter 102 may only see relatively small changes in the demand of the charger 108 that compensate for rises in the average consumption of the loads 106 served by the ESS 110.

The isolation of the loads 106 from the demand meter 102 has a broad-ranging impact on the design requirements and component makeup of the CMS as a whole. While some typical CMSs use bidirectional inverters to charge and discharge the ESS 110, the configuration of the embodiment of FIG. 1 requires only one direction of electrical energy flow from the grid connection 101 to the loads 106, as indicated by the arrows of the figure indicating a unidirectional flow of energy between the components of the CMS. This means that a bidirectional inverter can be replaced by more specialized and typically less-expensive charger 108 and converter 112 components. Nevertheless, in some embodiments an optional bidirectional inverter or other converter may be used in place of the ESS charger 108 to allow the ESS 110 to be both charged by the grid connection 101 and to discharge energy back toward the demand meter 102 or the grid connection 101. This may, allow the system to mitigate consumption of the other loads 104 when appropriate or to respond to a utility request for distributed generation on the grid. A bidirectional system may also have the ability to discharge to the grid to sell power back to the utility provider.

The CMS design of FIG. 1 allows more predictability and reliability in demand charges by allowing load profiles to be "flat-lined." This is because the isolation of the loads 106 from the meter 102 keeps the meter from registering sharp changes in consumption over short periods of time. Instead, the meter 102 detects the charging of the ESS 110 through the charger 108, which is controlled to charge at a relatively steady, "flat" rate, that typically only changes when the average consumption of the loads 106 changes for an extended period of time in order to keep the ESS 110 from depleting over time. The rate of consumption of the charger then returns to the approximate average consumption of the loads 106 after the state of charge of the ESS is stabilized.

The configuration of components in the CMS also serves to protect the utility provider and utility customer systems from the effects of large swings in consumption. In many CMSs, loads can create and eliminate spikes and valleys very quickly, and the system response lag behind these changes can create undesirable results. For example, if the load is low for some time, and the ESS 110 is recharging during that time, and then if the load suddenly spikes to a level near the utility service limit of the site, the ESS recharging might not stop quickly enough to prevent the consumption of the spike from being combined with the consumption of the recharging action, and circuit breakers and protective relays are tripped. The risk of such a scenario is drastically reduced when isolating the loads from the meter because more time is afforded to the system controller, charger, and ESS to react to swings in consumption rates.

In some embodiments, the CMS is capable of raising the effective utility customer's consumption limit as well. The ESS 110 provides a temporary energy supply that can be used to serve loads that would otherwise exceed the utility service limit of the site. The utility service limit as used herein refers to a rated maximum level of power drawn at one time from the utility mains, which, if surpassed, triggers breakers or other protective devices put in place to keep demand within safe limits. If the consumption of the loads of the site having the CMS (e.g., the loads from loads 104 and charger 108) nears the utility service limit, isolated loads 106 may be operated even though they would force the total metered consumption to exceed the service limit if they were connected to the meter directly. In this situation, the charger 108 keeps its consumption low enough to prevent the charger consumption from pushing the total consumption of the site over the utility service limit, even though the average consumption of the isolated loads 106 is great enough to deplete the ESS 110 over time. Therefore, the isolated loads 106 can be at least temporarily powered by the ESS 110, and the output of the ESS 110 can exceed the charging rate of the ESS by the charger 108 until the ESS is depleted.

Additional and Alternative CMS Configurations

In some embodiments, the layout of the CMS can be even more complex, wherein multiple power converters are used to connect the ESS 110 with different kinds of isolated loads, such as different loads 118 requiring differing AC and/or DC voltages from a separate power converter 120. This allows the ESS 110 to be more efficiently used for multiple types of loads (e.g., 106 and 118).

In some embodiments, certain isolated loads 122 may be even further isolated from the grid 101 by installing an additional charger 124, ESS 126, and power converter 128 between the power converter (112 or 120) and the further-isolated load 122. This configuration compounds the losses in efficiency caused by charging and converting the energy from the grid a second time, but it may be advantageous to further isolate or provide separate converters to loads that have especially wide swings in consumption so that the use of high-power converters and high-output energy storage can be tailored to be used for those loads in particular, since it may not be necessary to use the high-power equipment for the rest of the loads being isolated from the grid. Therefore, the high-power components can have lower specifications and less associated costs.

Figure 2:
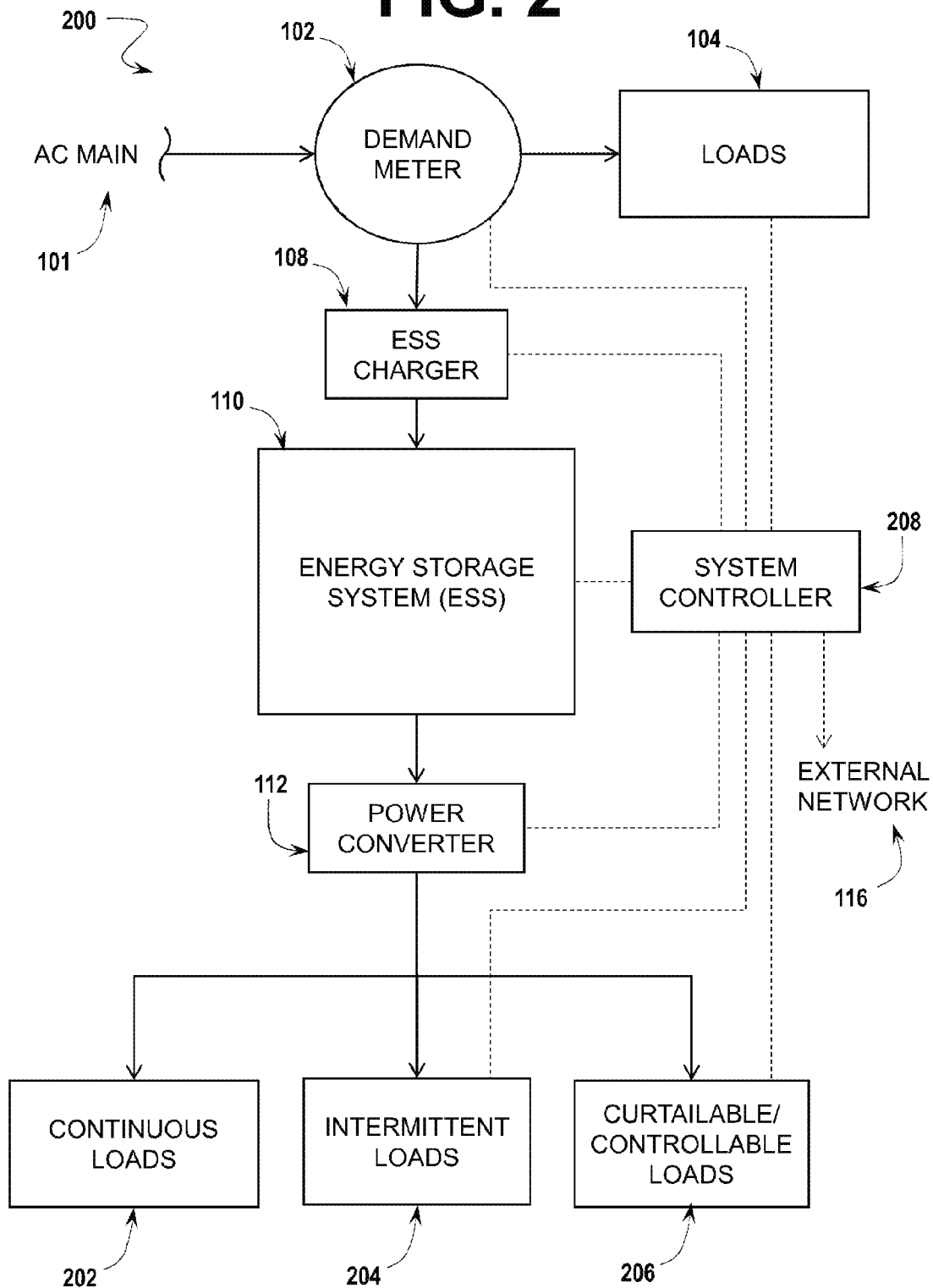
FIG. 2 is a block diagram of an exemplary embodiment of the invention having categorized isolated loads at a utility customer site.

FIG. 2 shows another embodiment of the invention bearing some alternative features. At this site 200, the loads are categorized according to priority for monitoring and for control or curtailment capability. Some loads have continuous consumption 202, others are intermittent 204, and some are considered curtailable or controllable loads 206. These categories are representative of the multitude of categories that could be devised by one skilled in the art.

In this CMS, intermittent loads 204 may be monitored by the system controller 208 in order to more effectively determine the charging levels of the ESS charger 108. The charging level of the charger 108 may need to be increased when intermittent loads 204 are more active to compensate for the increased drain on the ESS. If overall consumption of the site is determined by the system controller 208 (by reading the demand meter 102, by measuring the loads 104 at the site, or by using another similar method) to be approaching a demand charge-inducing limit or a utility service limit for the site, the system controller 208 may take action to curtail or control the consumption or power factor of the curtailable or controllable loads 206 and prevent the consumption at the site from reaching undesirable levels. In some embodiments, these loads 206 are controllable by an interface link to the system controller 208. The interface link may be a wired or wireless connection through which information can be transferred back and forth between the loads and the controller to carry out the control function of the controller.

Likewise, when the ESS 110 is low on energy and the charger 108 is not restoring enough energy to the ESS 110 to keep it continuously providing energy to the loads 202, 204, and 206, the curtailable or controllable loads 206 of this CMS may be directed to change (e.g. reduce or delay) their consumption requirements in order to prevent a loss of power to the other loads 202 and 204. Such methods and other method embodiments of the invention employed by the system controller 208 are described in more detail below. In a preferable embodiment, the curtailable/controllable loads 206 are EV chargers, which tend to be unpredictable as to when they will need to consume energy and the rate at which they will collectively draw energy, yet can be controlled by varying their maximum output power or disabling the chargers altogether.

The direct access between the system controller 208 of this figure and the demand meter 102 and loads 104 can be present in other embodiments of the invention, where feasible, and the presence of those connections in this figure is not intended to imply a negative limitation on those other embodiments where such connections are not illustrated in this manner.

Figure 3:
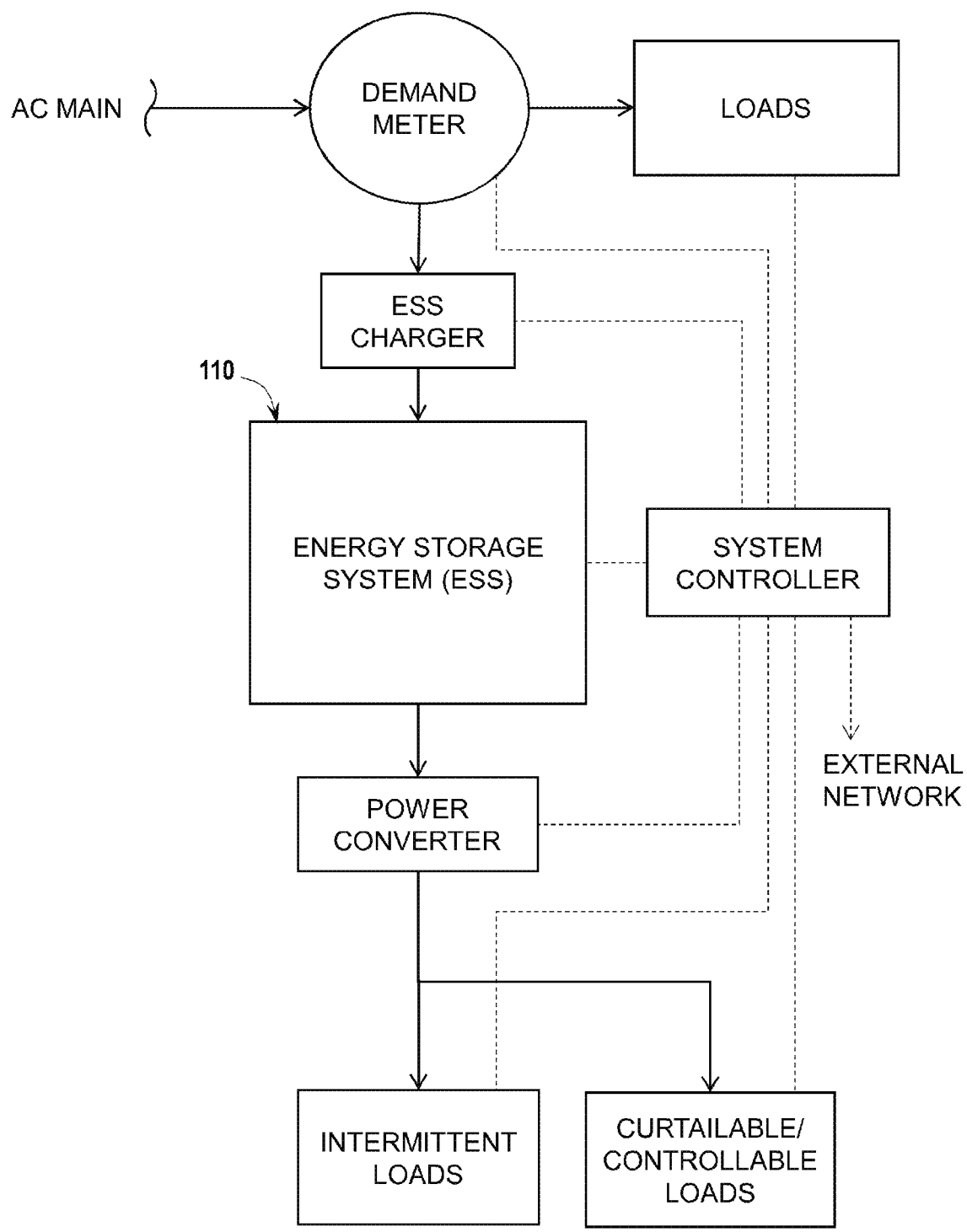
FIG. 3 is a block diagram of an exemplary embodiment of the invention having limited categorized isolated loads at a utility customer site.

FIG. 3 shows that in some embodiments it is preferable to isolate only intermittent loads and curtailable or controllable loads at the site. This embodiment allows the utility customer to reduce the size and storage capacity of the ESS 110. Given the same size of ESS 110 and consumption of the intermittent and curtailable/controllable loads, the embodiment of FIG. 3 has greater buffering ability than the embodiment of FIG. 2, since the drain on the ESS in FIG. 3 is lower during times when the ESS is predominantly recharging as compared to the ESS of FIG. 2, but the amount of energy in the ESS available for buffering will typically be greater. This is at least partially because the continuous loads are not consistently draining the ESS during those periods. Furthermore, curtailable or controllable loads can be managed during those periods to allow the ESS to recharge even more quickly when needed without the consistent demand of continuous loads slowing down the recharging rate.

Figure 4:
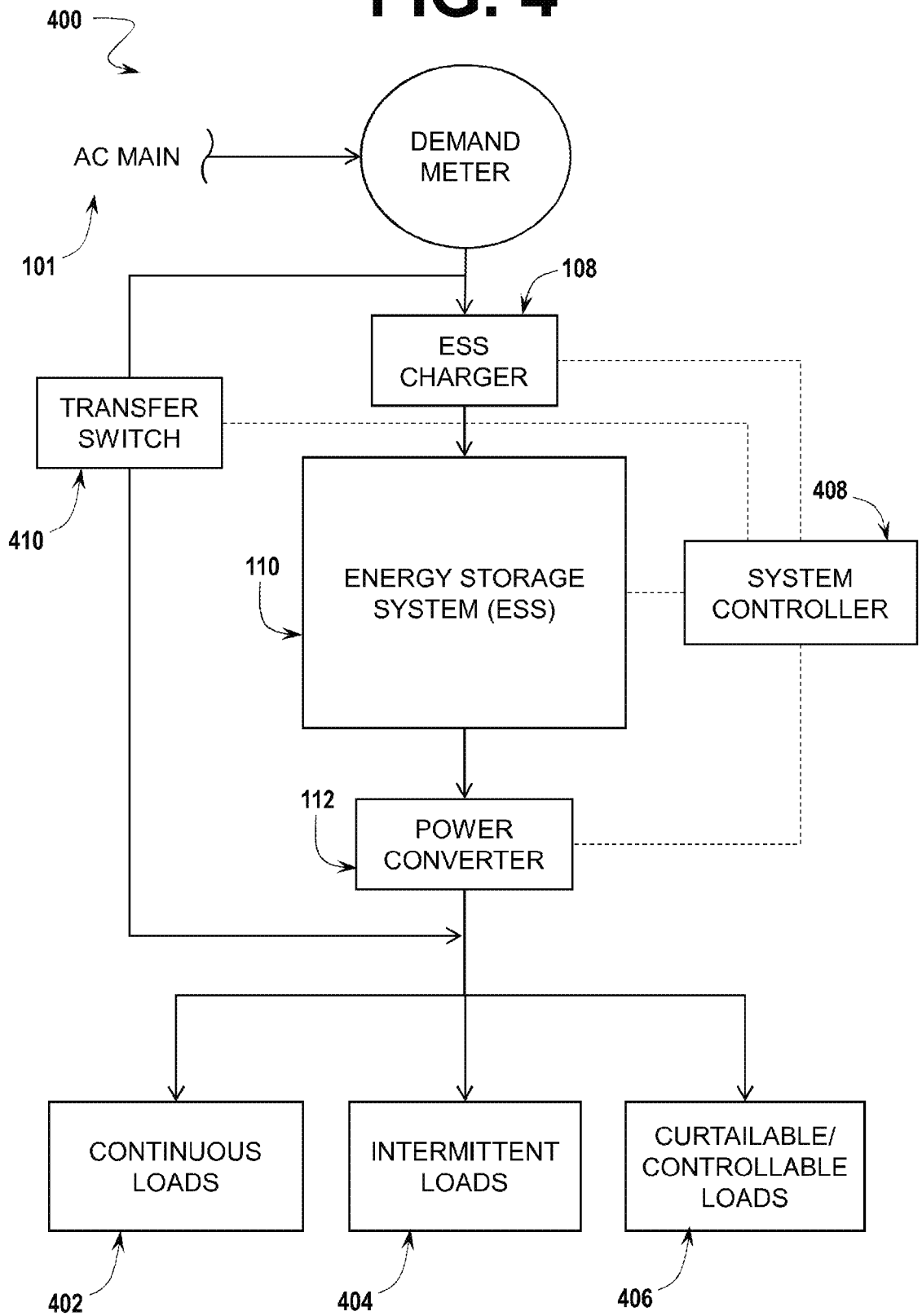
FIG. 4 is a block diagram of an exemplary embodiment of the invention having bypass switch functionality at a utility customer site.

FIG. 4 shows another embodiment of a system of the invention wherein the utility customer site 400 has all of its loads 402, 404, and 406 isolated from the grid connection 101. By isolating all loads from the utility grid 101, the utility customer is able to completely control the consumption recorded by the demand meter by controlling the charger 108. In such an embodiment, the ESS 110 is preferably sized to be able to supply energy to the loads equal to at least the maximum projected energy expended over the duration of a maximum projected peak in consumption. The output power capacity of the ESS 110 and power converter 112 also should be greater than or equal to a peak consumption level of the loads during the maximum projected peak in consumption to prevent needing to use an ESS bypass function when demand reaches high levels. Other embodiments illustrated herein may include isolation of all loads, even if not pictured in the figures as having that functionality.

The system controller 408 of this embodiment is also enabled to control a transfer switch 410. A transfer switch 410 such as this allows the utility customer or controller to bypass the charger 108, ESS 110, and power converter 112 completely, thereby taking some or all of the loads 402, 404, and 406 out of isolation and supplying them with energy from the grid 101 without ESS buffering. In some embodiments, the system controller 408 implements a control algorithm for the transfer switch 410 or the transfer switch is designed with a fail-safe function wherein the transfer switch is closed at critical times to prevent power loss to the loads when the ESS is unable to provide energy to the loads as necessary for their operation. For instance, to perform service of the charger 108, ESS 110, or converter 112, the transfer switch 410 may be closed to allow the loads to operate while the buffering components are inoperative. The charger, ESS, and/or power converter may have a modular design wherein the modular components are replaceable with other compatible modules when load requirements, maintenance requirements, or jurisdictional code requirements for the customer change. In these cases, having a bypass switch 500 allows the modules to be serviced or exchanged without interrupting supply to the loads. In these embodiments, when the ESS 110 is depleted, the loads may still receive power, but the charger 108 must increase its output to the ESS 110 to allow the ESS and converter 112 to be able to supply demand of the loads if there are spikes in consumption while the ESS is low on charge. This scenario is preferably avoided so that the increased output of the charger 108 does not incur new demand charges or cause the consumption of the site to exceed a utility service limit. In the embodiment of FIG. 4, the power converter 112 preferably is capable of synchronization with the utility distribution grid lines when the transfer switch 410 is closed, or the power converter 112 may be disconnected when the transfer switch 410 is closed to protect the converter and ESS if necessary, such as to ensure safety in situations where the ESS is serviced while the transfer switch is closed.

Figure 5:
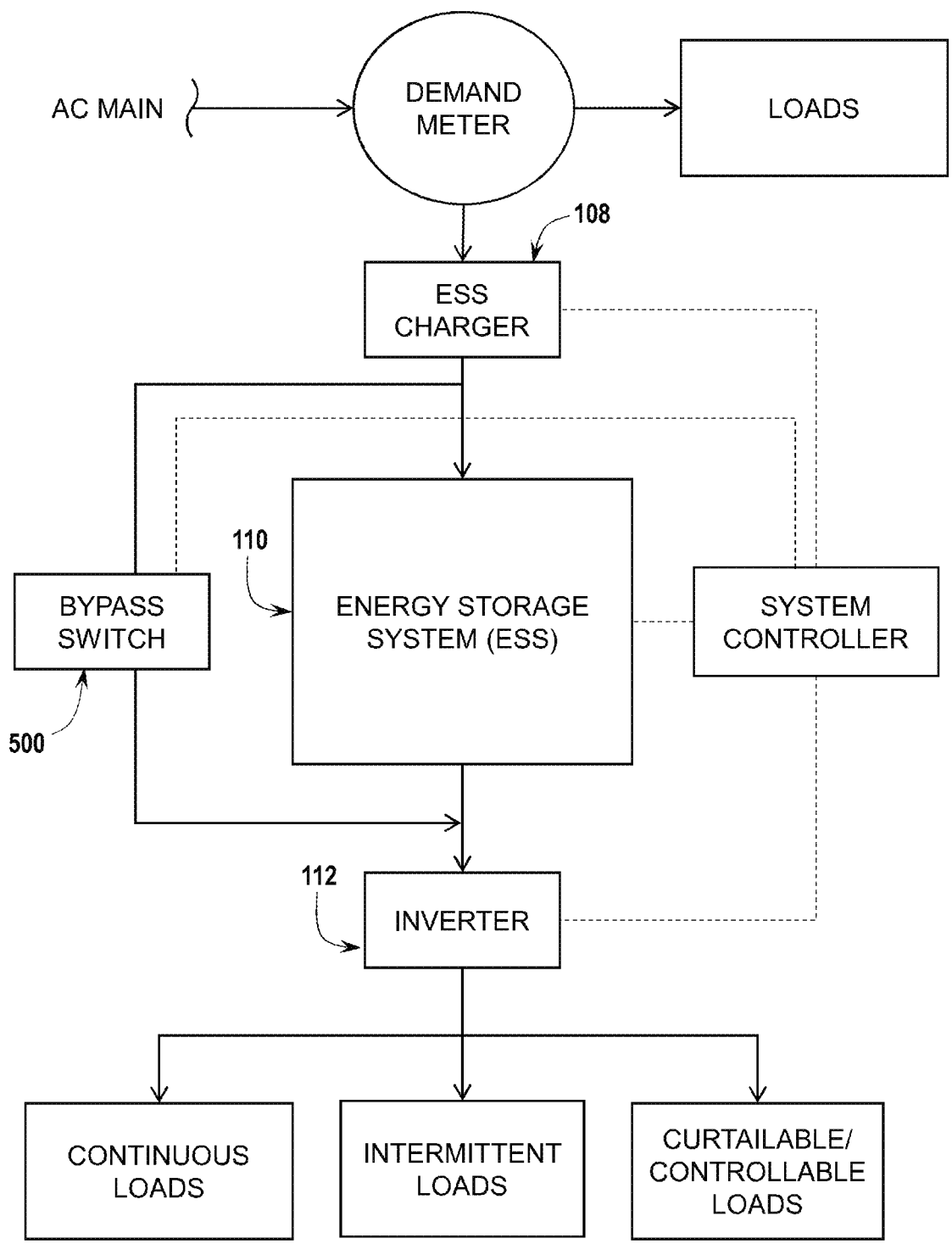
FIG. 5 is a block diagram of an exemplary embodiment of the invention having alternative bypass switch functionality.

FIG. 5 shows an exemplary alternative bypass switch configuration embodiment. Here, a bypass switch 500 connects the output of the ESS charger 108 to the input of the power converter 112, bypassing the ESS 110. This may be useful when the ESS is being serviced to ensure that energy is still provided to the loads. This embodiment may also be useful in place of the embodiment of FIG. 4 when the charger 108 and inverter 112 can provide power conditioning to the loads in the absence of the ESS 110 and the output of the charger and the input of the inverter are effectively the same. Furthermore, even if the ESS 110 is still operative, the bypass switch 500 allows the customer to supplement the power output of the ESS with energy from the grid through the charger 108. Thus, the isolated loads receive energy through the inverter shown from the ESS 110 and the grid (via the bypass switch 500) simultaneously. This configuration is preferably implemented when the charging rate of the ESS 110 is less than the consumption rate of the loads, the converter and inverter are capable of output that exceeds the input and output of the ESS, and the ESS is not depleted.

Figure 6:
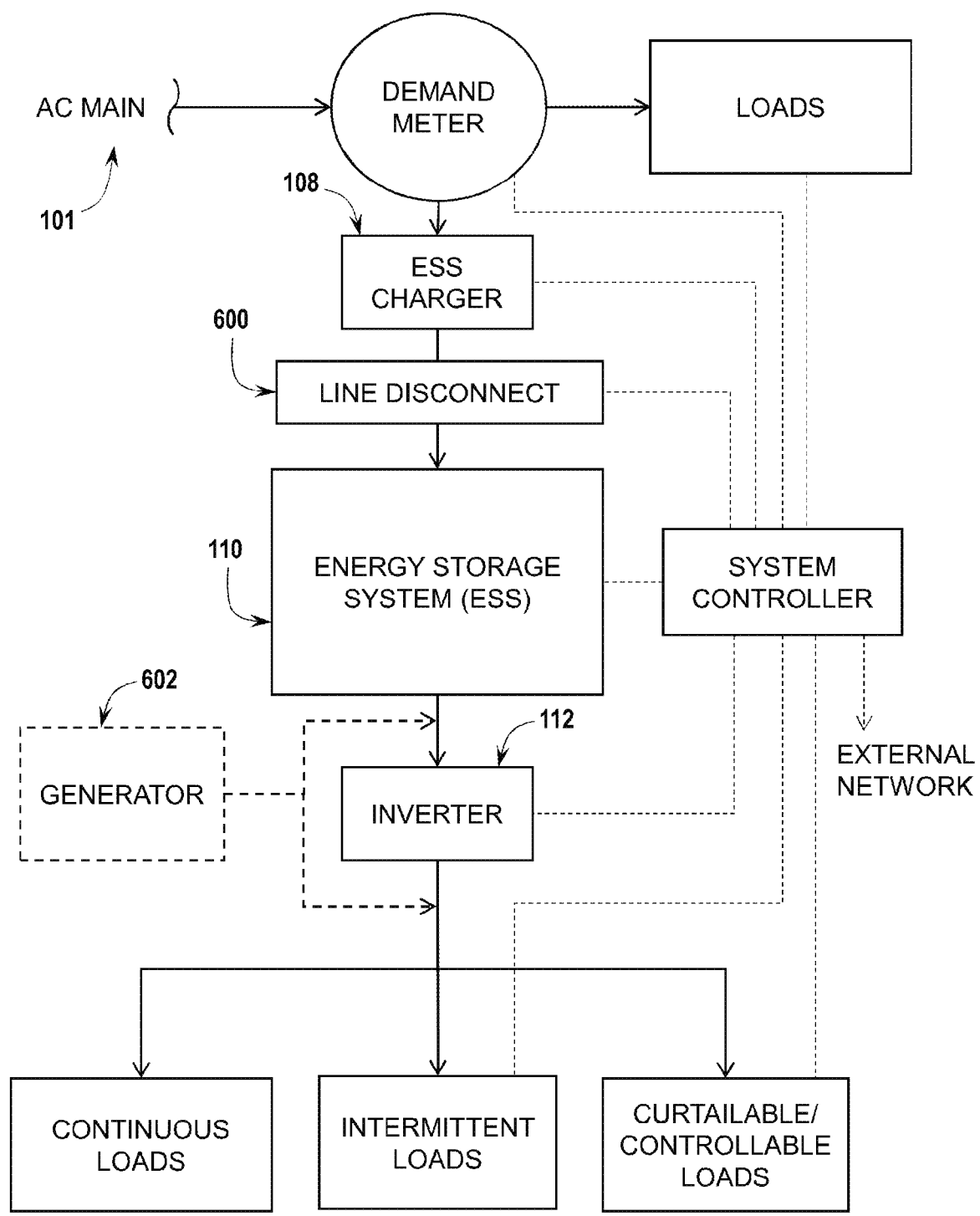
FIG. 6 is a block diagram of a bi-modally connected exemplary embodiment of the invention.

FIG. 6 is an exemplary embodiment showing a bi-modal consumption management system wherein a line disconnect 600 provides a bimodal connection between the utility distribution grid connection 101 the ESS 110. As used in this embodiment, "bimodal" refers to a system that can provide energy to loads whether it is off-grid or on-grid. While operating off-grid, the CMS may supply energy to the loads using the ESS 110, and the ESS would then be recharged when the connection between the ESS and the grid is restored. In some embodiments a photovoltaic or other type of generator 602 may be employed in supplement to, or as an alternative to, the ESS 110. Such a generator may include a fuel-based engine and generator, a solar/photovoltaic generator, wind generator, fuel cell, or other such energy generation means known in the art. A generator of this kind allows the system to extend its effective off-grid capacity by charging the ESS or decreasing the demand on the ESS by supplying energy to the loads. A generator 602 may also be included in other embodiments, as will be apparent to one of skill in the art.

A bimodal configuration of the system may be advantageous for sites that operate at levels of consumption that are near the utility service limit, as the system may be separated from the grid connection when there is a risk that demand will surpass the utility service limit or cause protective relays to be tripped. This configuration also provides an extra level of safety when service is done on the ESS 110, inverter 112, or other components that can be disconnected from the grid using the line disconnect 600.

Charging Level Management Methods

Figure 7:
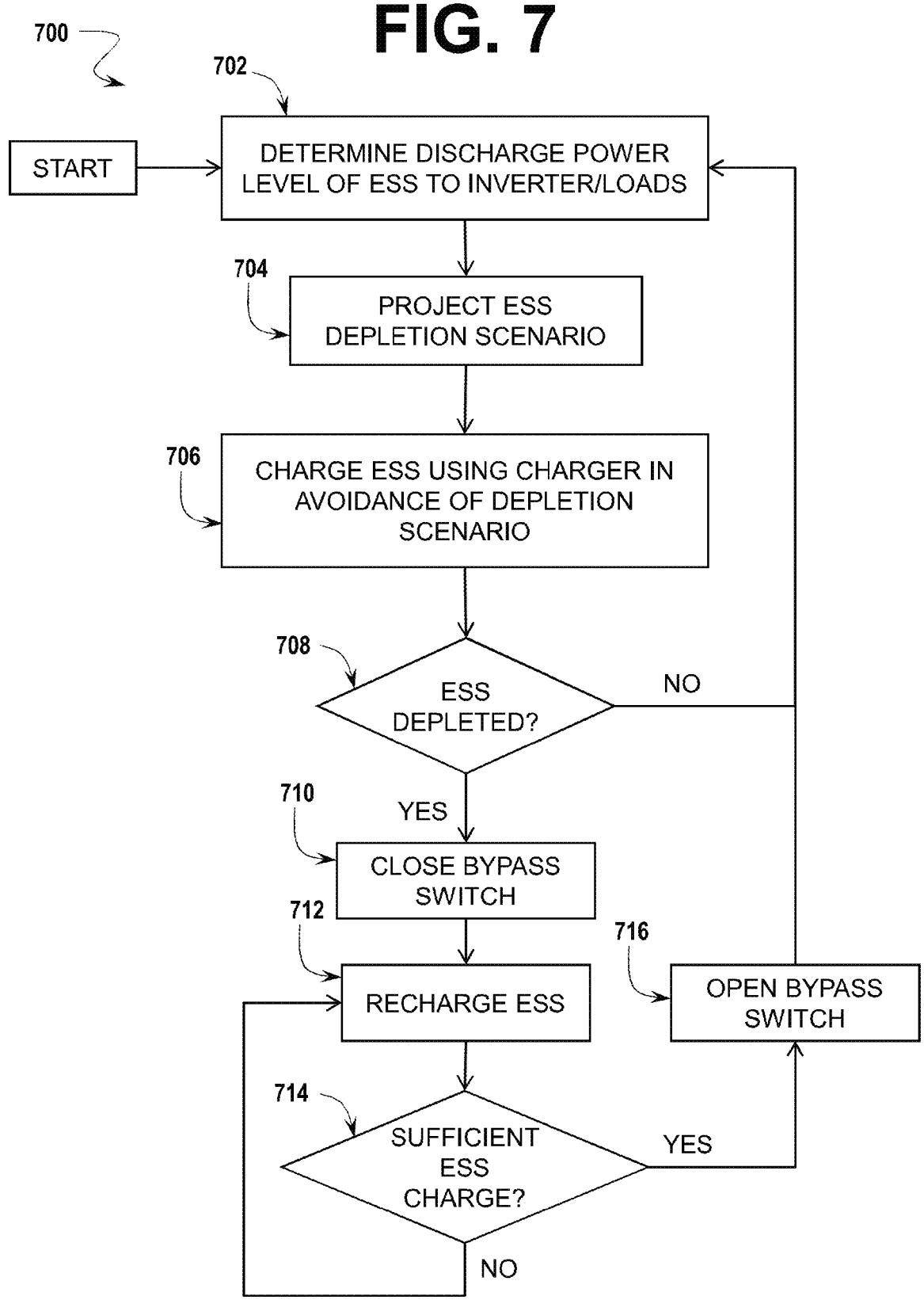
FIG. 7 is a block flowchart illustrating an exemplary control algorithm for a system controller of the present invention.

FIG. 7 depicts a flowchart of an exemplary method of managing the charging level of an energy storage system charger (e.g. charger 108). The process 700 begins as the system controller determines the present discharging power level of an ESS or an inverter of a CMS to a set of loads in step 702. This entails measuring the rate of energy transfer between the ESS and the loads and, in some embodiments, recording and storing the information measured. The system controller next processes this information to project an ESS depletion scenario (step 704). A depletion scenario may include the time remaining until depletion of the ESS at the current or recent average rate of ESS discharge, the expected amount of discharge over that timeframe, and other related factors. The scenario is used to produce a charging level for the charger that will prevent or delay the depletion of the ESS while a peak in load occurs so that bypass switching measures will not be needed. The controller then implements the charging level determined in step 706 and checks to see if the ESS is depleted in step 708. If the state of charge is acceptable, the controller resumes the process at step 702. If the ESS is depleted, the bypass features are used, wherein the bypass switch is closed in step 710 and the ESS is recharged while the loads are receiving power through the bypass switch route to the distribution grid (steps 712 and 714) until the ESS receives sufficient charge to open the bypass switch (step 716) and resume isolated load operation at step 702.

In some embodiments, the bypass switch provides an additional pathway for energy to reach the loads, such as is illustrated in FIG. 5. In these embodiments when the bypass switch is closed, the power provided by the ESS is supplemented by power provided from the distribution grid via the charger. Thus, when executing the process 700, when the ESS is depleted, the loads receive power through the bypass switch and the ESS simultaneously, and the ESS may be set to recharge during that time as well, as shown in step 712. When the state of charge has reached a nominal level, the bypass switch may be opened to allow the loads to receive energy exclusively from the ESS again.

In these embodiments, the definition of depletion of the ESS may vary from case to case. In some embodiments the ESS will be considered depleted when it reaches zero state of charge, but in other embodiments, the ESS is "depleted" when the amount of charge falls below a threshold lower limit. The threshold lower limit embodiments may be preferable in order to prevent the ESS from falling below a critical amount of charge and causing damage to the ESS or undue harm to the lifespan of the ESS components.

Figure 8:
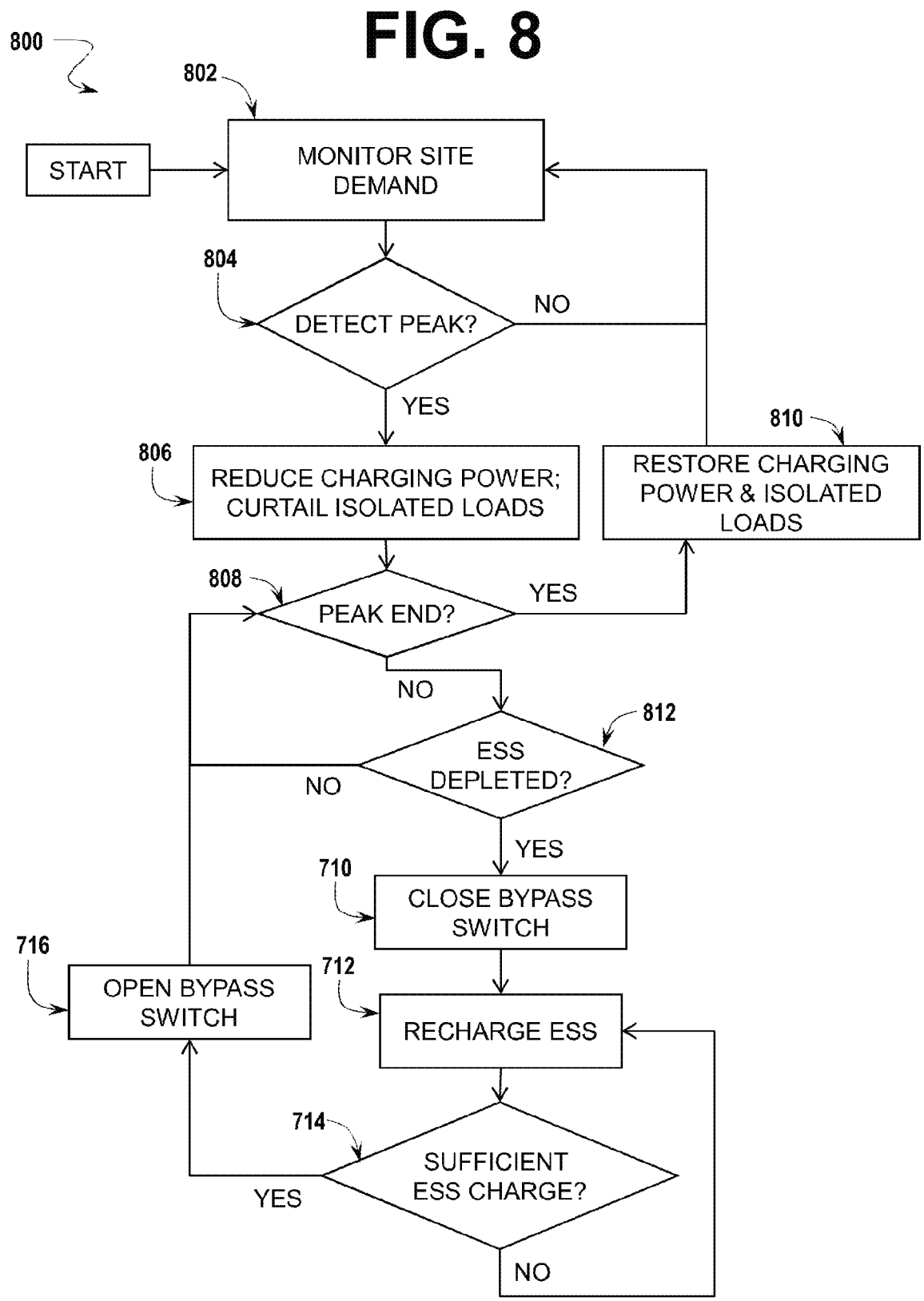
FIG. 8 is a block flowchart illustrating an additional exemplary control algorithm for a system controller of the present invention.

FIG. 8 depicts another exemplary method of managing the charging level of the energy storage system charger. This process 800 begins by the system controller measuring and monitoring the site demand in step 802. If a peak is detected in step 804, charging power of the charger is reduced in step 806 and, in at least some embodiments, some or all isolated loads are curtailed to reduce the drain on the ESS charge. Next, the controller checks to see if the peak has ended in step 808. If it has ended, normal charging power is restored and curtailed isolated loads are brought back to normal operations in step 810. If not, the controller checks to see if the ESS is depleted at step 812. If it is not depleted, it resumes the process at step 808. If it is depleted, it follows the bypass and recharge steps outlined in steps 710 through 716 as described previously before reaching step 808 again.

In this embodiment, the controller responds to changes in overall demand of the site to reduce the charging power of the charger or the discharging rate of the ESS, but the monitoring step 802 may alternatively or additionally consider the other consumption metrics discussed previously, such as time, historical or projected consumption of a load, cost of charging the ESS, etc. This method 800 is advantageous when a peak in consumption would cause the charging of the ESS to cause a new demand charge or cause the overall consumption of the site to exceed a utility service limit. In step 806 of these embodiments, the goal in reducing charging power is to cause the charger's load on the grid to be low enough that it does not push the consumption of the site to exceed a demand charge, utility service, or other limit at the site. By curtailing isolated loads in this step, the amount of time that the ESS can discharge is increased while the charging power is reduced. If necessary, the bypass switch can be used to supplement the power provided to the loads through the ESS with power from the grid.

Figure 9:
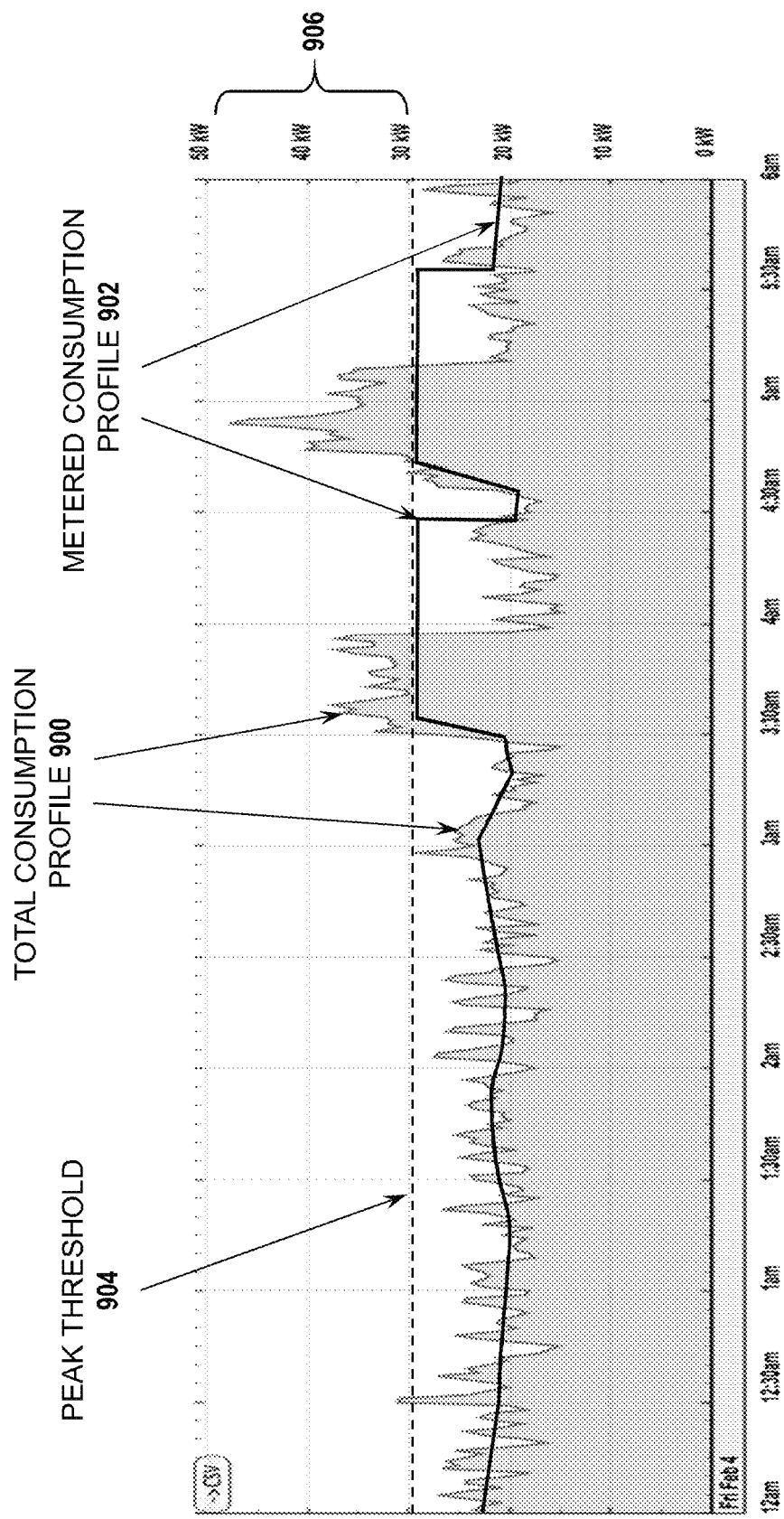
FIG. 9 is a load profile graph showing the recorded demand behavior of an exemplary consumption management system embodiment.

FIG. 9 shows an exemplary load profile that is possible to achieve using systems and methods described herein. Here, a total consumption profile 900 is illustrated over a six-hour span of time. The total consumption profile 900 shows the amount of energy being consumed by isolated loads at this site over that time period. A metered consumption profile 902 is also shown over the same period of time which illustrates the load profile of the isolated loads as seen by the utility meter due to the load drawn by the charger for the CMS isolating the loads. The metered consumption profile 902 follows an approximate average consumption of the total consumption profile with brief higher demand periods that appear when the total consumption profile 900 exceeds a peak threshold 904.

The peak threshold 904 may be defined as a demand charge-inducing limit, wherein a new or increased demand charge will be incurred if consumption exceeds the peak threshold for a sufficient length of time. The peak threshold 904 may also be defined as a utility service limit, wherein protective relays or circuit breakers would be tripped, or electrical service equipment would fail, if the consumption exceeds the peak threshold.

Here, it can be determined that when the consumption exceeds the peak threshold for a given length of time, the charging rate of the charger is increased to the peak threshold to prevent the ESS from depleting, and the charging rate is set to a level that is less than the peak threshold 904 in order to keep a new demand charge from forming. The brief higher demand periods extend beyond the time when the peaks in total consumption profile subside in order to recharge the ESS. The metered load 902 of the site is significantly more flat-lined than the total consumption profile 900, providing many benefits as discussed previously. The maximum difference bracket 906 between the total consumption profile 900 and the metered consumption profile 902 in this figure illustrates the maximum magnitude of demand charge mitigation that was achieved during this time period.

Figure 10:
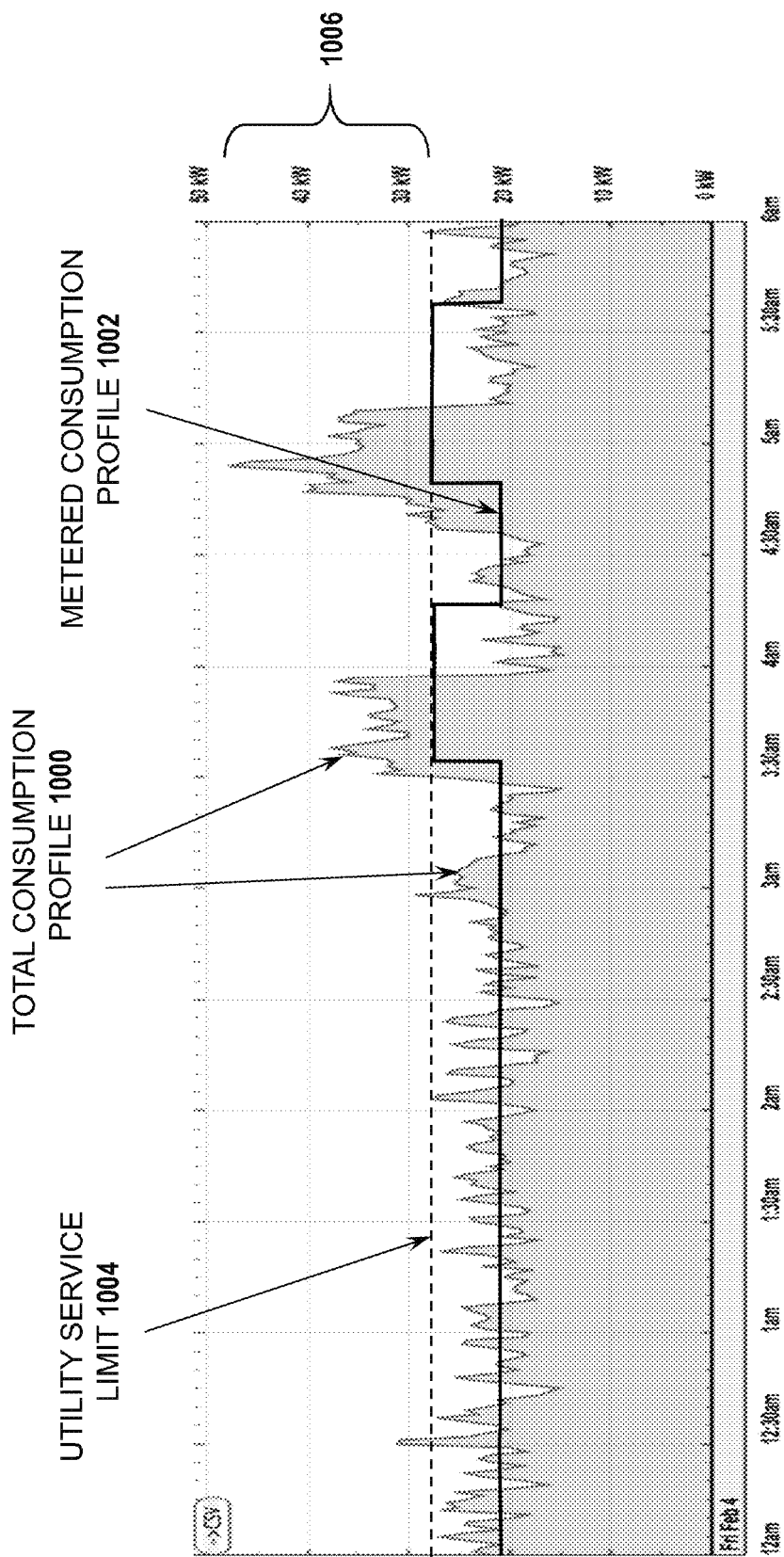
FIG. 10 is another load profile graph showing the recorded demand behavior of an exemplary consumption management system embodiment.

FIG. 10 shows a comparable load profile graph that may be produced according to another embodiment of the invention. As with FIG. 9, the total consumption profile 1000 shows the total consumption of the isolated loads over time, and the metered consumption profile 1002 is the demand that is logged by the utility meter for that time as a result of the charger drawing energy from the grid. Here, a utility service limit 1004 is the limiting threshold, so the metered consumption profile 1002 reflects that when the utility service limit 1004 is surpassed by the loads, the charger increases recharging up to the utility service limit 1004 without triggering an overload fault or circuit breaker.

The magnitude of the consumption of the isolated loads is permitted to exceed the utility service limit during these peaks because they are consuming energy stored in the ESS. The maximum difference bracket 1006 between the total consumption profile 1000 and the utility service limit 1004 shows the amount of increased load capacity at the site as a result of the loads being isolated from the grid by the ESS.

FIG. 11 is a flowchart showing another exemplary method of managing the consumption of a site according to the present invention. The process shown 1100 determines the state of charge (SOC) of the energy storage system (ESS) at step 1102, and if the SOC is greater than or equal to a target SOC, the charge rate for the charger of the ESS is set to zero in step 1104. If the SOC is less than the target SOC, the rate of change of the SOC is determined (e.g., as percent SOC per minute) and the current charge rate is measured from the charger in step 1106. If the charge rate is equal to the maximum charge rate of the charger and the SOC plus a timing factor times the rate of change of the SOC is less than or equal to an absolute minimum SOC, all curtailable loads are curtailed to a minimum consumption value, other loads are disabled, a transfer switch is closed, and the customer may be alerted of the conditions in step 1108. If the charge rate is equal to the maximum charge rate of the charger and the SOC is greater than the absolute minimum SOC, loads are curtailed or disabled incrementally until the rate of charge increases by a preset amount or maximum curtailment/disabling of loads is reached in step 1110. However, if the current charge rate is less than the maximum charge rate and the rate of change of SOC is negative, a new charge rate is set, such as the minimum value between the current charge rate minus the change in rate of SOC times a timing factor and the maximum charge rate in step 1112. Finally, if the current charge rate is the maximum charge rate and the rate of change in SOC is positive, any previously curtailed or disabled loads are restored to power incrementally or sequentially until the rate of change of SOC decreases by a preset value but remains positive.

The exemplary process 1100 assists in keeping loads isolated behind the ESS even though the loads have variable demand and the ESS has a varying state of charge because the charge rate and/or consumption rate of the loads being isolated by the ESS is manipulated to maximize the amount of energy in the ESS and the amount of time that the ESS can provide energy to the loads.

The steps of this method 1100 are intended to be representative and not exhaustive of the type of processes followed by a system controller of the present invention, and therefore the steps can be rearranged in some cases or may therefore be reliant on consumption metrics other than the rate of change of SOC or the total SOC of the ESS, for example.

MISCELLANEOUS DEFINITIONS AND EMBODIMENT SCOPE INFORMATION

Generally speaking, as used herein a "power converter" may refer to a generic electric power converter, inverter, transformer, regulator, voltage stabilizer, rectifier, power supply unit, or other conversion device or combination of these devices that may be used to convert the voltage, frequency, and/or phase of an electrical power source or signal from one form into another form.

As used herein, an "energy storage system" ("ESS") is a means for storing energy such as, for example, electrochemical batteries, compressed gas storage, pumped hydro storage, flywheel energy storage, capacitive energy storage, superconductive magnetic energy storage, fuel cell energy storage, combinations thereof, and other similar devices for energy storage known in the art. If the energy storage device includes a battery, the battery types may include rechargeable or non-rechargeable chemistries and compositions, such as, for example, lead-acid, alkaline, secondary lead acid, lithium-ion, sodium (zebra), nickel-metal hydride, nickel cadmium, combinations thereof, and other energy storage chemistries known in the art. Energy storage devices may be comprised of small or large numbers of cells, capacities, voltages, amperages, and other battery properties. They may be configured in unitary or modular designs and may follow standardized guidelines or customized specifications.

Some methods and systems of the embodiments of the invention disclosed herein may also be embodied as a computer-readable medium containing instructions to complete those methods or implement those systems. The term "computer-readable medium" as used herein includes not only a single physical medium or single type of medium, but also a combination of one or more tangible physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). In the present example, a computer-readable medium (such as memory) may be included to store instructions for the controller to operate the heating of the ESD and historical or forecasted temperature data for the ESD or its surroundings.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module or step names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "typical," "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or component of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An electrical system for managing electricity consumption measured by a utility provider of a site, comprising:
   an energy storage device connected inline and in series between a utility energy source and a load of the site, such that the load is isolated from the utility energy source, the energy storage device having an energy storage capacity and being bi-modally connected to the utility energy source to provide energy to the load whether the energy storage device is off-grid or on-grid, the load comprising at least one energy-consuming electrical system;
   a charger configured to charge the energy storage device from the utility energy source using a rectifier; and
   a system controller configured to receive a consumption metric, wherein the system controller is enabled to manage the charging of the energy storage device by the charger relative to the consumption metric, the system controller being enabled to increase or decrease consumption of the charger upon receiving a signal from the utility provider or a site operator to increase or decrease consumption.

2. The electrical system of claim 1, further comprising:
   a transferring switch which, when closed, provides power to the load from the utility energy source, bypassing the energy storage device.

3. The electrical system of claim 2, further comprising:
   a power converter configured to power the load using energy from the energy storage device at least while the energy storage device can provide enough energy to support the load.

4. The electrical system of claim 3, wherein closing said transferring switch disconnects said power converter.

5. The electrical system of claim 3, wherein closing said transferring switch connects a power output of said charger to a power input of said power converter.

6. The electrical system of claim 1, wherein said consumption metric comprises the present, historical, or projected consumption of at least one said electrical system of said load.

7. The electrical system of claim 1, wherein said consumption metric comprises the present, historical, or projected consumption of a state of charge of said energy storage device.

8. The electrical system of claim 1, wherein said consumption metric comprises a consumption level of the site, the consumption level of the site including at least a consumption level of said charger and a consumption level of at least one other load of the site consuming energy provided by the utility energy source, said other load not being isolated from said utility energy source by said energy storage device.

9. The electrical system of claim 8, the consumption metric being relative to whether the consumption level of the site exceeds a peak consumption threshold.

10. The electrical system of claim 1, wherein said consumption metric comprises at least one metric selected from the group consisting of: the time at which the charger is used, the cost of charging the energy storage device, and the cost of not charging the energy storage device.

11. The electrical system of claim 1, wherein said system controller is further enabled to control an energy consumption level or power factor of at least one electrical system of said load, the control being independent of managing said charging of said energy storage device.

12. The electrical system of claim 1, said energy storage device having a maximum output power greater than a maximum charging power output from said charger.

13. The electrical system of claim 12, said maximum output power being greater than a peak threshold of the site.

14. The electrical system of claim 1, wherein the load comprises all loads which are contributing to demand on said utility energy source from the site.

15. The electrical system of claim 1, wherein said load comprises a plurality of energy-consuming electrical systems, and at least one of, but not all of, said energy-consuming electrical systems is connected to said energy storage device through one power converter.

16. An electrical system for managing electricity consumption measured by a utility provider of a site, comprising:
   an energy storage device connected inline and in series between a utility energy source and a plurality of isolated controllable loads of the site such that the isolated controllable loads are isolated from the utility energy source, the isolated controllable loads being intermittent, curtailable, or controllable loads, the energy storage device having an energy storage capacity and being bi-modally connected to the utility energy source to provide energy to the plurality of isolated controllable loads whether the energy storage device is off-grid or on-grid;
   wherein the isolated controllable loads are powered by energy from the energy storage device via a power converter;
   wherein the energy storage device is charged from the utility energy source by a charger using a rectifier;
   a plurality of continuous loads not isolated from the utility energy source, the continuous loads having a consumption level; and
   a system controller enabled to manage charging the energy storage device by the charger, the charging being relative to consumption of the isolated loads, the system controller being enabled to increase or decrease consumption of the charger upon receiving a signal from the utility provider or a site operator to increase or decrease consumption.

17. A method of shielding demand fluctuations in an electrical load from a utility provider meter, the method comprising:
   supplying one or more loads by providing energy stored in an energy storage device to the loads, the loads being isolated from a utility distribution grid by the energy storage device due to the energy storage device being connected in series between the grid and the loads, while charging the energy storage device from a bi-modal connection to the grid in such a manner that the consumption on the grid does not exceed a peak threshold, and the demand on the grid would exceed the peak threshold if the loads were not isolated by the energy storage device, the bi-modal connection allowing the energy storage device to provide energy to the loads whether the energy storage device is off-grid or on-grid;

providing a rectified signal from a charger to the energy storage device;

increasing or decreasing consumption of the charger upon receiving a signal from a utility provider or a site operator to increase or decrease consumption.

18. The method of claim 17, wherein the load comprises all loads which are contributing to demand on said utility distribution grid at a site.

19. The method of claim 17, wherein said peak threshold is a demand charge-inducing consumption limit.

20. The method of claim 17, wherein said peak threshold is a utility service limit.

21. The method of claim 17, further comprising:

supplementing said supply of said loads with energy from said utility distribution grid from when said energy storage device is depleted to when said energy storage device is charged enough to isolate said loads again.

22. An electrical system for managing electricity consumption measured by a utility provider of a site, comprising:

a utility energy source;

a demand meter connected directly to the utility energy source;

an energy storage system (ESS) charger connected directly to the demand meter;

an ESS bi-modally connected directly to the ESS charger, the ESS having an energy storage capacity;

at least one load connected directly to the ESS, wherein the at least one load is isolated from the utility energy source by the ESS, the at least one load being configured to receive energy from the ESS whether the ESS is off-grid or on-grid;

a system controller configured to receive a consumption metric, wherein the system controller is enabled to manage the charging of the ESS by the ESS charger relative to the consumption metric, the system controller being enabled to increase or decrease consumption of the ESS charger upon receiving a signal from the utility provider or a site operator to increase or decrease consumption.

* * * * *